United States Patent [19]

Smith

[11] 4,149,790
[45] Apr. 17, 1979

[54] MASKING DEVICE FOR FILM CASSETTE

[76] Inventor: Frank Smith, 2077 Jane Ave., Columbus, Ohio 43219

[21] Appl. No.: 834,110

[22] Filed: Sep. 19, 1977

[51] Int. Cl.² .......................... G03B 1/00; G03B 17/26
[52] U.S. Cl. ................................... 354/125; 354/276
[58] Field of Search ................. 355/74; 354/159, 276, 354/110, 120, 125, 275

[56] References Cited

U.S. PATENT DOCUMENTS

| 1,285,176 | 11/1918 | Histed | 354/159 |
|---|---|---|---|
| 2,989,907 | 6/1961 | Nelson | 354/125 |
| 3,088,390 | 5/1963 | Zimmerman | 354/125 |
| 3,922,700 | 11/1975 | Asano et al. | 354/276 |

Primary Examiner—Donald A. Griffin
Attorney, Agent, or Firm—Sidney W. Millard

[57] ABSTRACT

Apparatus for selectively masking the film frame of a larger format camera as of the self-developing variety. A frame type retaining member removably fits over the film frame opening of a film cassette. This member slideably retains a rectangular mask which is dimensioned to cover about one half of the extent of the film frame opening.

10 Claims, 5 Drawing Figures

MASKING DEVICE FOR FILM CASSETTE

BACKGROUND

Photographic cameras of the instant processing variety generally are categorized in providing for a relatively larger film format. This larger film size stems basically from a requirement that a resultant developed picture must be large enough for utilization without resort to enlargement techniques. Many models of these cameras and related film, as currently marketed, in addition to utilizing the larger format size, also provide a film geometry selected to achieve a more enhanced or artistically desirable image framing. For example, the film recorded image has an elongate rectangular shape.

When utilized in an appropriate camera, the instant processing film or photosensitive material is packaged in given quantity within a molded plastic cassette structure, one flat surface of which is formed to define an opening, the periphery of which is of rectangular shape corresponding with the noted image format. To reinforce this periphery or edge, a small ridge of rectangular cross-section is integrally molded therealong. This ridge is considered to serve the additional function of assuring proper alignment and fitting of the cassette and opening at the exposure plane of the camera. Generally, when the film laden cassette is loaded within a camera, the ridge may slightly deform to fit within a corresponding cavity formed with the rear of the camera body. This cavity is formed under very close tolerance considerations during camera fabrication to assure proper positioning of a film unit at the image plane.

Following cassette insertion, the camera is readied for use by manually pulling a tab which effects the removal of an opaque, web-like dark slide to permit exposure of a forwardmost photosensitive film unit within the cassette.

Considering now in more detail the noted larger film format size and geometry, it may be noted that the consuming public long has held an interest in smaller format, "wallet-size" photographs. Such size is easily carried and accessible, but of a size perhaps smaller than that desired for mounting within photographic albums. It would be desirable to provide a capability for generating such smaller format image size utilizing inexpensive cameras of the instant processing variety, but without wasting valuable film and without requiring elaborate modification of those cameras already sold and in use by the general public. Such conversion must be so simple as to be capable of being carried out by the typical amateur user of the camera.

Looking to the latter aspect in more detail, to be practical within the amateur photographic market, a "wallet sizing" conversion device must meet somewhat rigid "human engineering" design criteria. For example, the prospective purchaser will not be interested in any form of device which can be construed as one wherein he or she will be called upon to modify a camera in any manner or form. The procedures to be carried out by the purchaser must be simple in the extreme and not involve the camera structure itself nor conventional camera film loading procedures. Next, the "wallet sizing" conversion must operate reliably while remaining simple in structure and operation. Further the conversion must be just as simply reversable to regain the larger format image size. Additionally, an artistically desirable format geometry present as an elongate rectangle should be preserved even in the smaller format. Next, the cost of such arrangement must be commensurate with the corresponding lower cost of popularly priced cameras.

SUMMARY

The present invention is addressed to a film frame selective masking device which easily adapts a conventional amateur system of the self-developing type to incorporate a capability for providing photographs of "wallet-size" format. Non complex in nature and fabricable at low unit cost, the masking device of the invention readily lends itself to use by the amateur photographer.

It its preferred embodiment, the device is provided, inter alia, as a thin frame member which is positionable by the operator within the film frame opening of a film laden cassette. The frame member is positioned in resilient, "snap action" fashion just at the cassette opening periphery and serves to define an outer restraint for an opaque mask. This mask, rectangular in configuration and having a surface extent of about one-half the film frame area, is positioned between the cassette, i.e., the forwardmost film unit, and the thin frame. During installation by the operator, the opaque dark slide is left in place; the mask is positioned over it; and the thin frame is snapped into place over the entire assemblage. The cassette then is positioned within a camera in the usual fashion and the dark slide is removed with no change in operating procedure to ready the camera for use. By only operating upon the inexpensive disposable film cassette to achieve a "wallet sizing" function, the amateur operator is not intimidated by being called upon to approach the task of a "camera modification." In consequence, the device of the invention meets all human engineering criteria for achieving market acceptance. Of additional importance, however, by inserting the two components of the invention within the cassette film frame opening, there is substantially no forewardly disposed obscuration within the light path of the camera which otherwise may be the cause of flair peripheral blurred edge effects. Further avoidance of flair is assured through the coating of both frame 30 and mask 22 with a flat black paint or the like non-reflective coating.

In use, by tilting the camera to one side, the opaque slide moves by gravity to one side of the film frame to mask one half of it. A photograph then is taken using only the unmasked portion of the film frame. Following that exposure, the camera is tilted in an opposite direction to cause the mask to slide into its other extreme position and a next exposure is made using the opposite half of the film unit. Following the second exposure the film unit, now carrying two images, is removed through camera-mounted processing components such as rolls and the like.

As a further feature and object of the invention, the above-described opaque mask is configured so as to contact the film or photosensitive surface only in the region of its corresponding peripheral contact with the frame member. This assures an importantly reliable sliding action of the mask when the camera is tilted to effect its movement from one terminal position to another.

Other objects of the invention will, in part, be obvious and will, in part, appear hereinafter.

The invention accordingly comprises the apparatus possessing the construction, combination of elements and parts which are exemplified in the following detailed disclosure. For a fuller understanding of the nature and objects of the invention, reference should be had to the following detailed description taken in connection with the accompanying drawings.

DETAILED DESCRIPTION

As discussed above, the apparatus of the present invention operates in conjunction with a film cassette of a variety incorporating a relatively larger, snapshot size, opening which is so located within an instant processing camera when the film cassette is inserted therewithin as to position an uppermost photosensitive film unit or material at the image plane of the camera. Such opening will be in the form of a relatively elongate rectangle, such geometry having been found in the photographic arts to achieve more pleasing photograhic framing characteristics.

Figure 1:
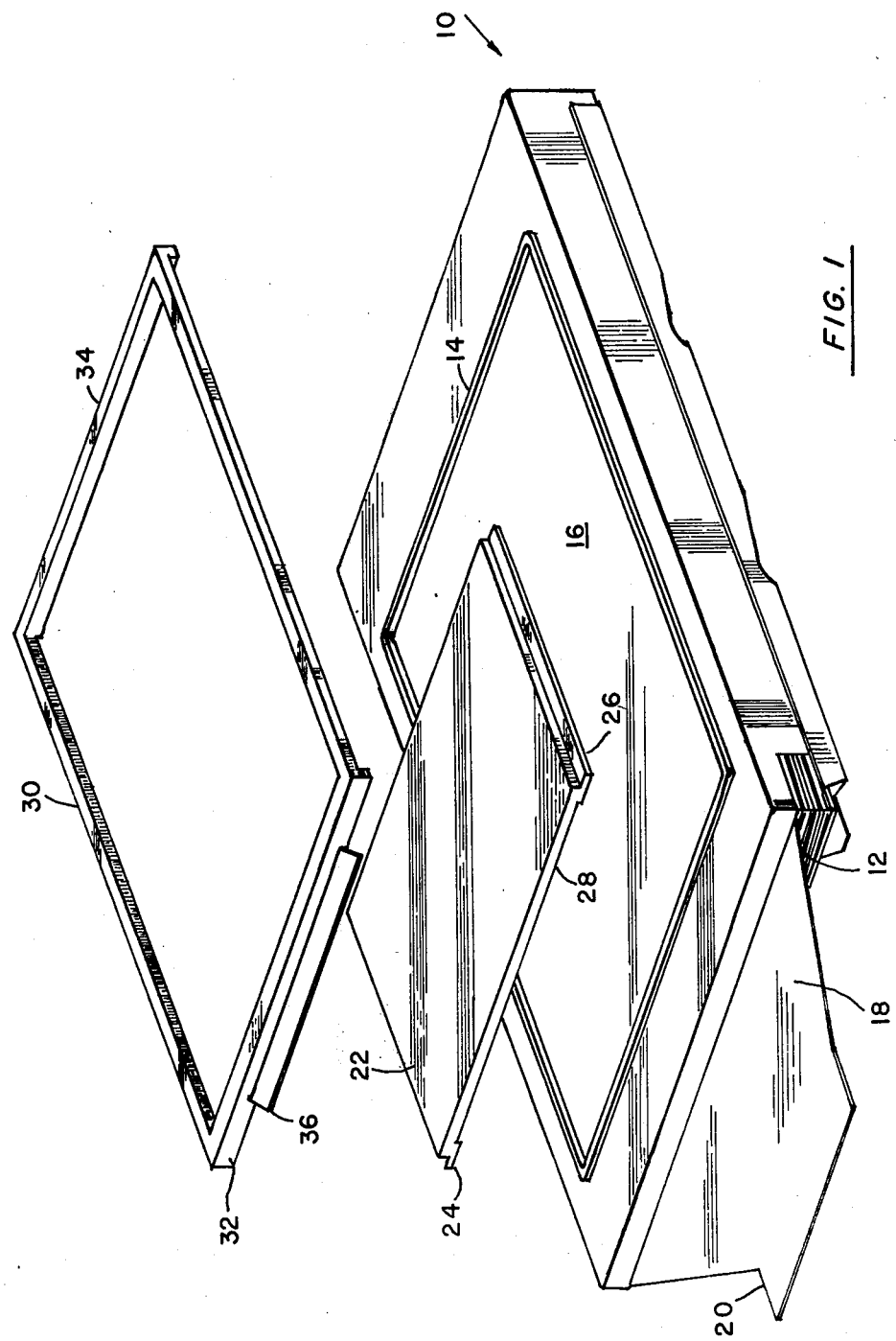
FIG. 1 is a perspective exploded view of the components of the invention in combination with a film cassette with which they are intended for use.

Looking to FIG. 1, such a film laden cassette is represented generally at 10 as it would appear following removal from its container and wrappers and in readiness for normal insertion within a camera. In this regard the cassette 10 incorporates a plurality of film unit components as at 12 which are so positioned within cassette 10 as to be sequentially located at the rectangular opening thereof which is defined by a small ridge 14 of rectangular cross-section. The lower surface of ridge 14 defines the film frame and image plane for exposure of the uppermost one of the photosensitive materials of units 12. This image plane is designated by the general numeral 16. To protect the uppermost one of the photosensitive components of film units 12 upon opening a fresh package of film, cassette 10 incorporates a dark slide 18 which is formed of a web of paper or the like which is treated so as to remain opaque to actinic radiation. In normal operation of the instant processing camera, the cassette 10 is inserted within the receiving chamber of the camera, whereupon the ridge 14 is somewhat forceably conformed or nested within a carefully formed cavity at the rear image plane region of the camera. The receiving chamber then is closed and the dark slide 18 is manually removed by grasping and pulling the small tab 20 thereof. When the dark slide has been removed, a first photosensitive film unit is automatically positioned at the image plane of the camera ready for exposure.

Figure 4:
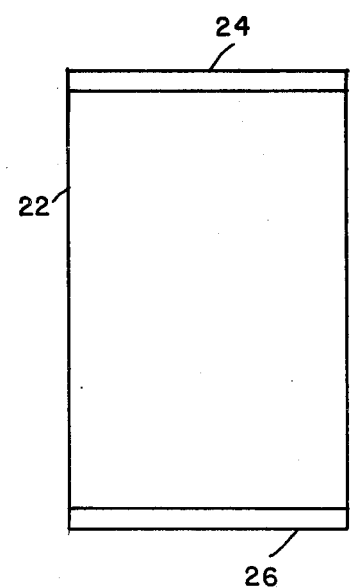
FIG. 4 is a top view of the mask element of the invention.
Figure 5:
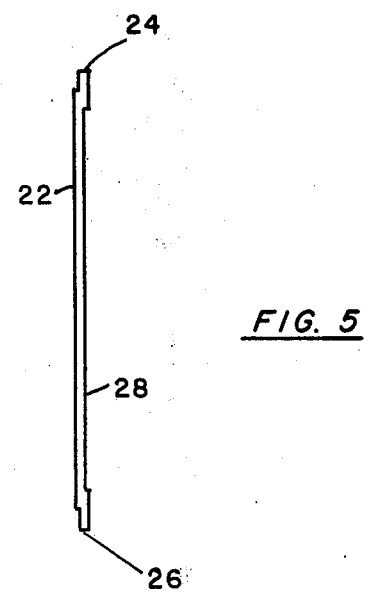
FIG. 5 is a side view of the mask element of the apparatus of the invention.

The instant invention provides an arrangement wherein only one half of the image plane area is exposed per actuation of the camera within which cassette 10 is inserted. The mask arrangement for the invention is present as mask component 22 which is formed of a material opaque to actinic radiation, preferably a metal such as steel or the like. As will be elaborated upon in more detail later herein, the use of a heavier metal facilitates the reliability of operation of the device as well as facilitates the manufacture of the device under more economical, tolerance achieving fabrication considerations. Mask 22 is of generally rectangular shape and is formed having an area extent preferably representing one half of the film frame area 16. Mask 22 further is configured having two external edges, as at 24 and 26, which are configured in stepped fashion such that the substantial portion of its underlying surface as at 28 will be positioned above the uppermost film unit at film frame 16 when the mask 22 is directly positioned thereover. This particular structuring of mask 22 is revealed in detail in FIGS. 4 and 5.

The dimensioning of mask 22 is provided such that the stepdown peripheries thereof at 24 and 26 will rest directly upon only the edge surfaces of the uppermost film unit at image plane 16, the edges of these portions riding directly adjacent the corresponding inwardly positioned edge of ridge 14. As is apparent, when the mask 22 is on one side of the opening 16, one half of the image area thereof adjacent mask 22 is available for exposure and will provide a snapshot size format corresponding to about one half of the area of the image plane. Note, that while mask 22 does ride upon the film surface, it does so only at the periphery thereof.

Figure 2:
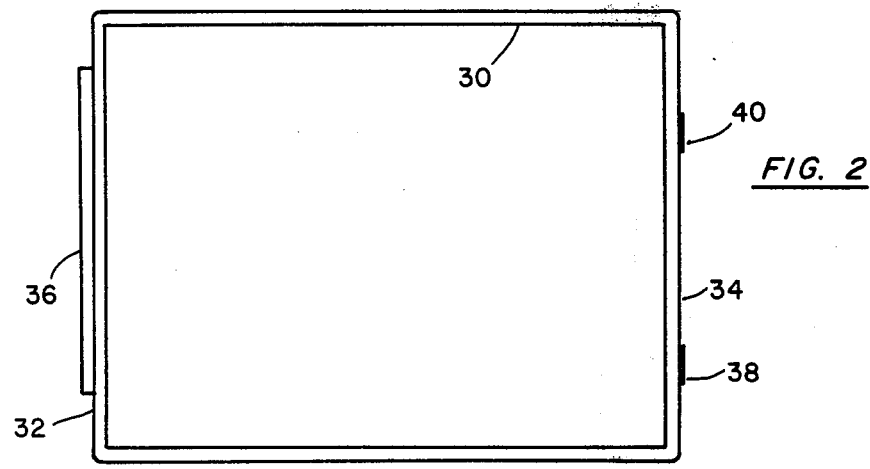
FIG. 2 is a top view of the thin frame member of the invention.
Figure 3:
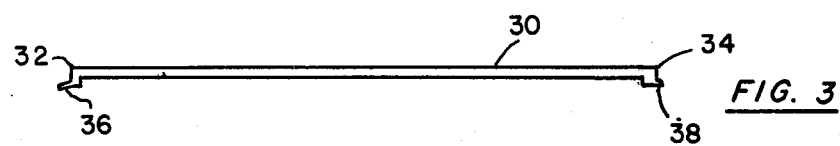
FIG. 3 is a front view of the frame member of FIG. 2.

To retain mask 22 in slideable adjacency with the uppermost film unit at plane 16, a thin frame member 30 is provided. Referring additionally to FIGS. 2 and 3, frame 30 is shown to comprise a thin frame structure having slightly enlarged end components 32 and 34. End component 32 is configured having an integrally formed outwardly and slightly downwardly extending tab portion 36, while portion 34 incorporates very small protruding detents 38 and 40 (FIGS. 2 and 3). Preferably, the frame is formed or stamped of a generally rigid material. As is apparent, the purpose of the frame 30 is to retain mask 22 in slideable relation over the uppermost film surface. To accomplish this in simple and expedient fashion, the extended portion 32 in combination with tab 36 are arranged so as to maintain frame 30 nominally at the elevation of ridge 14. The slight canting of tab 36 provides a generally upwardly directed spring bias of the frame against the underside of that portion of the ridge 14 with which it comes in contact. As is revealed from the drawings, that portion may be either of the shorter sides of the elongate rectangle defined by ridge 14. Similarly, side 34 of the frame incorporates very small detents 38 and 40 which will be situate just beneath the surface of ridge 14 as it is present oppositely that side with which tab 36 is engaged. In affect, a slight spring action is exerted by the frame assembly to provide for its retention at a proper orientation permitting the slideability of mask 22. Of further importance, however, the spring-like or resilient behavior of frame 30 is such as to "give" in concert with ridge 14 in the course of insertion of cassette 10 within the receiving chamber of a camera. Thus, the arrangement of the invention accommodates to the pre-existing "interface" design extent between ridge 14 and the film cassette receiving structure of the instant processing type camera. Note further in this regard, that mask 22 does not hinder this necessary resiliency, inasmuch as it rides over and is supported upon the outer surface of an uppermost positioned film unit. While remaining of necessary simple structure the design of the invention accommodates to the necessary human engineering type aspects relating film laden cassette and camera receiving chamber.

The slightly enlarged side 34 of the frame assures appropriate positioning against an adjacent ridge portion 14 as well as the proper positioning of the detents 38 and 40 therebeneath. When the frame is inserted by the operator into cassette 10, mask 22 will have been dropped upon the darkslide 18 covered image plane 16. Tab 36 then is simply inserted beneath a corresponding underside of ridge 14 and the frame 30 then is pivoted thereabout downwardly such that detents 38 and 40 snap beneath the opposite corresponding side of ridge 14. Frame 30 thus is resiliently retained between these two components 32 and 34. Additionally, the frame is positioned slightly above the corresponding stepped portions 24 and 26 of mask 22. With the simply installed arrangement, mask 22 is free to slide from one extreme position within the area defined by ridge 14 to the other. Of course, the mask stops in such an extreme position upon the side thereof abutting against a corresponding portion of ridge 14.

In operation, mask 22 is positioned over the darkslide surface at plane 16 and frame 30 is then positioned thereover in the manner above described. The operator then inserts cassette 10 along with the assembly of the invention into the receiving chamber of the camera in normal fashion. The receiving chamber then is closed and the tab 20 of darkslide 18 is pulled to remove the darkslide and effect the positioning of an uppermost one of the photosensitive components in the cassette 10 at the image plane of the camera. The camera then is tilted to one side or the other at the option of the operator. Mask 22 will slide to one side of opening 16 and as it abuts against ridge 14 at the conclusion of this sliding movement, a distinct "click" will be heard by the operator. The camera then is utilized in normal fashion, however, only one-half of the image plane is exposed. To accommodate for this, the operator merely frames the image to be photographed in the appropriate one-half of the view finder of the camera. Following this exposure, the camera is tilted in the opposite direction. As before, mask 22 will slide until it reaches an abutting orientation against an opposite side of ridge 14. Hereagain, a distinct "click" will be heard by the operator to apprise him that mask 22 is in proper position for uncovering the opposite side of plane 16. Another exposure is taken in conventional manner, the operator using the opposite half of the image area of the view finder. Following the completion of the second exposure, the film unit, now carrying two "wallet size" exposed portions, is removed through a processing station of the camera in the usual fashion and a film unit carrying two wallet size pictures ultimately is derived.

As is apparent from the above, the instant device is quite simple and in its preferred embodiment readily may be used by the typical amateur camera operator. No alteration of the camera itself is required to achieve wallet-size format photography and the frame may be inserted at the option of the operator. Following exhaustion of the cassette, the frame 30 and mask 22 are simply removed for another use.

As is apparent no hint of camera modification is required to describe the use of the apparatus. Further, the frame-mask combination of the invention uniquely accomodates to the tolerance-related engineering aspects already present within the instance processing camera design.

Since certain changes may be made in the above described apparatus without departing from the scope of the invention herein involved, it is intended that all matter contained in the description thereof or shown in the accompanying drawings shall be interpreted as illustrative and not in a limiting sense.

I claim:

1. For use in conjunction with a photographic camera system of the instant processing variety having means defining a rectangular film frame opening and means for removably retaining a film unit containing cassette having a rectangular opening defined by an outwardly extending peripheral ridge portion dimensioned in correspondence with said film frame opening for nesting therewithin when said cassette is operably positioned within said camera, the selective masking apparatus comprising:
   a thin, rectangular mask for positioning within said cassette opening, formed of material opaque to actinic radiation, and of area extent for covering about one half of the area of said cassette opening, said mask being configured having oppositely disposed peripheral portions of surface extent substantially less than said area extent, for slideable contact with the forwardmost disposed one of said film units; and
   a resiliently thin frame member removably positionable within said cassette opening in intimate adjacency with said ridge portion and configured for retaining said mask in slideable adjacency between said forwardmost disposed one of said film units and said frame member.

2. The selective masking apparatus of claim 1 in which said frame material is a resilient metal.

3. The selective masking apparatus of claim 1 in which said oppositely disposed peripheral portions of said mask are configured to extend downwardly from one surface thereof so as to support the remaining portion thereof outwardly from an adjacent said forwardmost disposed one of said film units.

4. The selective masking apparatus of claim 1 in which said frame member is configured for removable retention in press-fit fashion within said cassette opening.

5. For use in conjunction with a photographic camera system of the instant processing variety having means defining a rectangular film frame opening and means for removably retaining a film unit containing cassette having a rectangular opening defined by an outwardly extending peripheral ridge portion dimensioned in correspondence with said film frame opening for nesting therewithin when said cassette is operably positioned within said camera, the selective masking apparatus comprising:
   a thin, rectangular mask for positioning within said cassette opening, formed of material opaque to actinic radiation, and of area extent for covering about one half of the area of said cassette opening, said mask being configured having oppositely disposed peripheral portions of surface extent substantially less than said area extent, for slideable contact with the forwardmost disposed one of said film units; and
   a thin frame member removably positionable within said cassette opening in intimate adjacency with said ridge portion and configured for retaining said mask in slideable adjacency between said forwardmost disposed one of said film units and said frame member, said frame member also is configured having an integral, elongate tab portion, said tab portion extending from said frame member at an angle acute to the surface of said uppermost film unit when said frame member is mounted within said cassette for promoting the engagement of said frame member with said ridge portion.

6. The selective masking apparatus of claim 5 in which said frame member side opposite said one side is configured having at least one protruding detent engageable with a corresponding underside of said cassette ridge portion when said frame member is mounted therewithin.

7. The selective masking apparatus of claim 6 in which the outwardly disposed surfaces of said mask and frame member are coated with a nonreflective coating.

8. The selective masking apparatus of claim 6 in which said oppositely disposed peripheral portions of said mask are configured to extend downwardly from one surface thereof so as to support the remaining portion thereof outwardly from an adjacent said forwardmost disposed one of said film units.

9. The selective masking apparatus of claim 8 in which said frame material is a resilient metal.

10. The selective masking apparatus of claim 9 in which the outwardly disposed surfaces of said mask and frame member are coated with a nonreflective coating.

* * * * *